No. 761,155. PATENTED MAY 31, 1904.
L. EILERTSEN.
PROCESS OF MAKING DENTAL PLATES.
APPLICATION FILED OCT. 9, 1901.
NO MODEL.
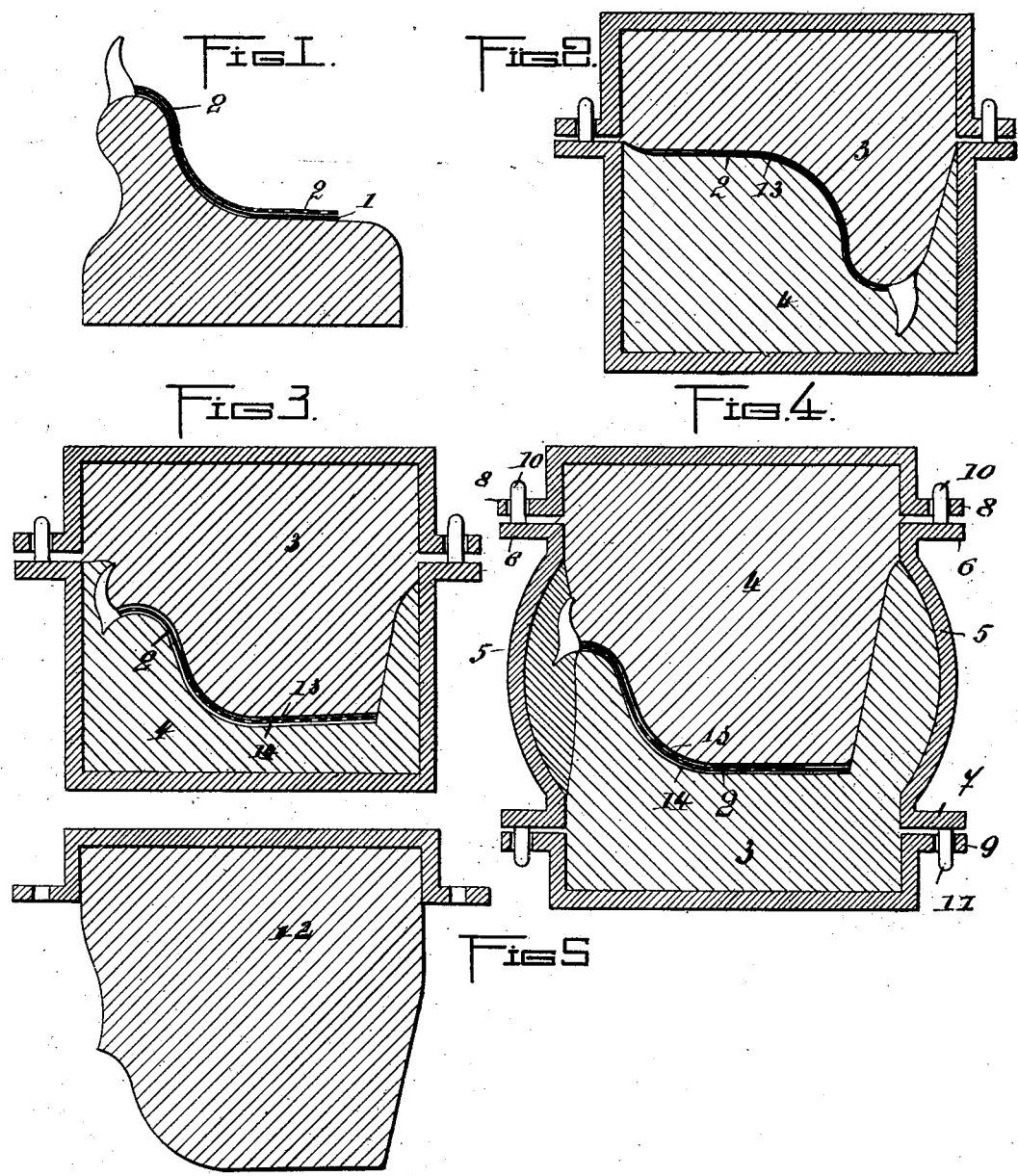

No. 761,155. Patented May 31, 1904.

UNITED STATES PATENT OFFICE.

LUCIEN EILERTSEN, OF PARIS, FRANCE.

PROCESS OF MAKING DENTAL PLATES.

SPECIFICATION forming part of Letters Patent No. 761,155, dated May 31, 1904.

Original application filed February 25, 1901, Serial No. 48,681. Divided and this application filed October 9, 1901. Serial No. 78,148. (No specimens.)

*To all whom it may concern:*

Be it known that I, LUCIEN EILERTSEN, a citizen of the French Republic, and a resident of Paris, France, have invented certain new and useful Improvements in Processes of Constructing Dental Plates, of which the following is a specification, this application being a division of my prior application, Serial No. 48,681, of February 25, 1901.

This invention relates to a process of constructing dental plates wherein celluloid is employed; and its aim is to obtain the advantages of metal—that is to say, durability, strength, and sufficient weight—to give to the lower parts the necessary stability, these advantages being obtained by means of very thin coatings of celluloid covering the metallic base on all sides in such a way that no portion of the said metallic base remains visible.

I would state that I make no claim in this case to the plate itself; but in order to render my process clear it will be necessary for me to state somewhat clearly the character of the plate treated according to my process, and this I will do hereinafter.

In the drawings, Figure 1 shows by a sectional view the sheet of lead 1 and plate 2 applied to the object treated. Fig. 2 is a similar view showing a further step in the process, this view also showing a two-part mold. Fig. 3 shows the mold seen in Fig. 2, but with the parts treated therein reversed in position. Fig. 4 shows a sectional view of a three-part mold and showing the parts treated therein. Fig. 5 shows a sectional view of the piece 12.

In order to fix the coating in direct contact with the mouth, the first thing to do is to stamp the metal plate and secure the teeth and hooks in the usual manner, only before soldering them to the plate, and in order to leave between this plate and the roof of the mouth the space required for the coating of celluloid, which should not be thicker than a thin sheet of paper, the operation must be commenced by placing on the object to be treated a sheet of lead 1 or other soft metal, Fig. 1, the thickness of which is equal to that desired to be given to the celluloid. Then the metal plate 2 is placed thereon. This plate should fit exactly onto the sheet of lead, the precaution being taken beforehand to pierce holes in this plate at certain intervals in order that the two surfaces of celluloid may be connected through these perforations. Thus, as will be seen, the perforated plates are those used generally by dentists when it is desired to make a plate hold in india-rubber or celluloid or to retain india-rubber or celluloid on the plate. The perforated plate exactly covering the sheet of lead, it is necessary to fasten the hooks and teeth to their respective plates by means of wax and then solder the whole in the usual manner. The metal frame thus formed is replaced on the model, but without the sheet of lead, and into the space left by the removal of this sheet wax is run, thereby giving an exact impression of the roof of the mouth. So far the outer surface of the metal has been left uncovered. When using a mold formed in two parts, the object thus prepared is placed on the reverse side in plaster—that is to say, the part covered with wax is on the outside, as will be seen in Fig. 2. Then plaster is run into the counterpart 3, reproducing exactly the impression of the wax. This wax is then taken out and replaced by a sheet of celluloid cut to about the size and shape of the metal plate and being a trifle thicker than the sheet of lead. The celluloid is then molded in the ordinary way by means of heat and pressure. The celluloid 14 penetrates through all the small holes and is held to the metal plate. The plaster is then withdrawn. The surface of celluloid having to exactly fit the plastic model is then cleaned, after which the uncovered metal surface is coated with wax 13 and the plaster is replaced in the opposite direction, Fig. 3—that is to say, with the celluloid to the plaster and the wax-covered part to the outside. The plaster is then run as before into the counterpart 3 in order to take the impression of the wax surfaces, after which the wax is removed. A second sheet of celluloid of the same size and thickness as the former is then cut out, and it is molded in the usual manner by means of heat and pressure. only as the celluloid, unlike non-vulcanized india-rubber, does not possess soldering properties, it is necessary to wash the sheet with a solution of celluloid and also to wash the metal plates, so as to dissolve the celluloid already fixed on the other side through the small holes in the said plate, and thus allow the two celluloid surfaces to become united. When the celluloid has been heated and pressed between the two parts of the mold, the object is withdrawn from the plaster. It is then covered on both sides with two coatings of celluloid about as thick as a thin sheet of paper united through the holes in the metal.

If desired, the object may be placed only once in plaster; but it is necessary to use the mold shown in Fig. 4, composed substantially of three parts. An intermediate part 5, in which the metal pieces it is desired to enamel on both sides are placed is hollowed on the inside in order to retain the plaster serving to hold the dental pieces in place. This intermediary part is provided with an upper flange 6 and a lower flange 7, on which are respectively fixed the rods 10 11, serving to guide the parts 3 4, as in the ordinary celluloid molds. These parts 3 and 4, furnished with a bottom, present on the side opposite to this bottom flanges 8 and 9, provided with holes corresponding to the rods 10 and 11 and serving to run in the plaster, which has to give the impression of the upper and lower surface of the object to be enameled on both sides.

The following is the manner in which the mold in three parts is used: After having prepared the metal pieces in the manner previously described it is covered on both sides with wax instead of on one side only, as in the previous case. The object is then placed in plaster in the middle part 5, so as to leave the upper and lower parts of the metal plate to be covered with celluloid free, Fig. 4. The object is thus held in the plaster by means of the teeth and hooks. Plaster is then run into the upper and lower parts 4 and 3, so as to obtain the exact impression of the two surfaces of the wax 13 and 15. This done, the wax is removed from the upper part corresponding to the free part of the object and plaster is run into a second change-piece 12, Fig. 5, in order to exactly mold the surface of the metal plate when the wax is taken off. The object of this is to have a solid support for the metal plate to prevent its slipping when the first coating of celluloid is applied by pressure. The first coating being fixed, the same means are used for fixing the second coating of celluloid as in the former instance. In order to give it the required shape and thickness, the first part 4 is taken away and heat and pressure are applied. The object is then covered with celluloid on both sides. All that remains to be done is to take it out of the plaster and finish it.

The last-described process is very advantageous when it is desired to renew quickly the celluloid of a metallic set. The metal portion may be used an indefinite number of times, and the celluloid may be renewed as often as desired.

For the parts relating to the lower jaw the principle is still the same. It always consists in obtaining metal parts, covering with celluloid on both sides. However, in constructing the plates for the lower jaw it is desired in order to obtain the greatest stability to bring the center of gravity as far back as possible. This is effected by taking advantage of the lightness of celluloid for the front part and making the rear part of tin covered with celluloid. The construction is as follows: After having placed the wax fitting for the lower jaw in plaster upside down—that is to say, with the teeth underneath—several counterparts are formed, one of which covers only the rear part corresponding to the tin; the front part, where the tin is to be poured in, being left free. Then after having well heated the mold the tin or other metal is poured in up to the first small molar, or thereabout, after which a small portion of the metal is removed in order to leave place for the celluloid. Holes are made for the latter, which is then secured in the usual manner.

If it is desired that none of the metal parts shall be visible, all that is necessary is to cover them with celluloid after removal from the plaster.

Having fully described my invention, what I claim, and desire to secure by Letters Patent, is—

The herein-described process for covering on both sides perforated metal plates of the character set forth with thin layers of celluloid, which process consists first in obtaining the required space below the metal by means of a sheet of stamped soft metal placed beneath said plate before fixing the teeth or hooks, then covering the metal basis first with celluloid on one of its surfaces and then on the other and placing said foundation twice in plaster, once with the right side up and once the reverse way, then covering the metal foundation with celluloid, first on one side and then on the other, in the manner described, using the mold in three parts, in the middle portion of which is fixed the metal piece held merely by the hooks and teeth, the two surfaces to be enameled being uncovered at the same time, thus allowing the metal plate to be covered with celluloid without displacing said plate.

In testimony whereof I have hereunto set my hand in presence of two witnesses.

LUCIEN EILERTSEN.

Witnesses:
 ADOLPHE STURM,
 J. ALLISON BOWEN.